(12) United States Patent
Ueda et al.

(10) Patent No.: US 10,469,384 B2
(45) Date of Patent: Nov. 5, 2019

(54) COMMUNICATION DEVICE AND COMPUTER-READABLE STORAGE MEDIUM

(71) Applicant: KDDI CORPORATION, Tokyo (JP)

(72) Inventors: Kazuaki Ueda, Fujimino (JP); Atsushi Tagami, Fujimino (JP); Kenji Yokota, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 15/923,568

(22) Filed: Mar. 16, 2018

(65) Prior Publication Data

US 2018/0205655 A1 Jul. 19, 2018

Related U.S. Application Data

(63) Continuation of application No. PCT/JP2016/083880, filed on Nov. 16, 2016.

(30) Foreign Application Priority Data

Nov. 18, 2015 (JP) .................................. 2015-225615

(51) Int. Cl.
*H04L 12/743* (2013.01)
*H04L 12/66* (2006.01)
(Continued)

(52) U.S. Cl.
CPC .......... *H04L 45/7453* (2013.01); *H04L 12/66* (2013.01); *H04L 45/306* (2013.01); *H04L 45/42* (2013.01); *H04L 45/742* (2013.01)

(58) Field of Classification Search
CPC ............................. H04L 45/7453; H04L 12/66
See application file for complete search history.

(56) References Cited

U.S. PATENT DOCUMENTS 8,386,622 B2 2/2013 Jacobson
2013/0227166 A1 8/2013 Ravindran et al.

FOREIGN PATENT DOCUMENTS

JP 2009-277234 A 11/2009
JP 2013-141232 A 7/2013
JP 2015-197920 A 11/2015

OTHER PUBLICATIONS

Jacobson et al., Palo Alto Research Center, "Networking Named Content", in Proceedings of ACM document CoNEXT '09, Dec. 1-4, 2009, Rome, Italy.

(Continued)

*Primary Examiner* — Ronald B Abelson
(74) *Attorney, Agent, or Firm* — Fitch, Even, Tabin & Flannery LLP

(57) ABSTRACT

A communication device includes: a forwarding unit configured to determine, if a first packet is directed to the communication device, whether or not a forwarding destination address of the first packet can be specified based on a value contained in a first field of the first packet, the forwarding unit setting, if it can be specified, the specified forwarding destination address as the destination address of the first packet and forwarding the first packet; and a processing unit configured to perform, if no forwarding destination address of the first packet can be specified and the first packet includes a request packet that requests an object according to an object name of the object, processing for specifying the forwarding destination of the first request packet based on the object name.

8 Claims, 5 Drawing Sheets

(51) Int. Cl.
*H04L 12/717* (2013.01)
*H04L 12/747* (2013.01)
*H04L 12/725* (2013.01)

(56) References Cited

OTHER PUBLICATIONS

Ooka, et al., "A Deployment of Content-Centric Networking by Using OpenFlow Networks", Technical Report of the Institute of Electronics, Information and Communication Engineers (IN2013-19), May 2013, pp. 1-6.
Shimizu et al., "Service Expansible LabelFlow/SDN and Information Centric Operation", IEICE Technical Report, Jul. 2013, vol. 113, No. 140, pp. 113 to 118.
EPO; Application No. 16866331.8; Supplementary European Search Report dated Aug. 28, 2018.
Campista, Miguel Elias M. et al.,"Challenges and Research Directions for the Future Internetworking", IEEE Communications Surveys & Tutorials, Apr. 2014, pp. 1050-1079, XPO11547646, vol. 16, No. 2, USA.
Tantatsanawong, Panjai et al., "Improving Big Data on Research and Education Networks using Future Internet Approach: A Case Study of Networks Analysis", 12th International Conference on Electrical Engineering/Electronics, Computer, Telecommunication and Information Technology, IEEE, Jun. 24, 2015, pp. 1-5, XP033197047.

FIG. 5A

| OBJECT NAME | FORWARDING DESTINATION |
|---|---|
| A | IF#1 |
| B | IF#2 |
| /KDDI.com/A | Add#20 |

FIG. 5B

| HASH VALUE | FORWARDING DESTINATION |
|---|---|
| Hash#1 | Add#30 |
| Hash#2 | Add#40 |
| ... | ... |

FIG. 6

| OBJECT NAME | FORWARDING DESTINATION |
|---|---|
| /KDDI.com/A/1 | Add#10 |

COMMUNICATION DEVICE AND COMPUTER-READABLE STORAGE MEDIUM

This application is a continuation of International Patent Application No. PCT/JP2016/083880 filed on Nov. 16, 2016, and claims priority to Japanese Patent Application No. 2015-225615 filed on Nov. 18, 2015, the entire content of both of which is incorporated herein by reference.

TECHNICAL FIELD

The present invention relates to a communication device in a network that performs relay between content delivery networks, on which content is divided into a plurality of objects and the divided objects are distributed.

BACKGROUND ART

Networking in which content is distributed based on a name indicating the content has been proposed. PTL 1 and Non-PTL 1 disclose content centric networking (CCN), which is one type of such networking.

In a content centric network, a server device that publishes content divides the content into at least one object, which is referred to as a "chunk", and a client device obtains the content as per divided object unit. Furthermore, in the content centric network, a communication device (hereinafter, referred to as "forwarding device") that has forwarded an object can save (cache) the object. When the forwarding device has received an interest packet (request packet) that requests an object stored therein from the client device, the forwarding device can transmit the object stored therein to the client device that has transmitted the interest packet, without forwarding the interest packet to the server device.

The following will describe an example of an operation of the forwarding device. The forwarding device manages a content store (CS), a forward information base (FIB), and a pending interest table (PIT). "CS" refers to information indicating an object stored in this device. "FIB" refers to information indicating the relationship between an interest packet and an interface from which the interest packet is to be forwarded. "PIT" refers to information indicating the relationship between an object requested by a forwarded interest packet and an interface that has received the forwarded interest packet.

Upon receiving an interest packet, the forwarding device searches the CS, and determines whether or not an object requested by the interest packet is stored. If the requested object is stored, the forwarding device transmits the object stored therein to the client device that transmitted the interest packet. On the other hand, if the object requested by the received interest packet is not stored, the forwarding device searches the PIT, and determines whether or not it has already forwarded an interest packet that requested the same object as that of the received interest packet and is waiting to receive the object. If the forwarding device is waiting to receive the object, the forwarding device does not forward the received interest packet, and updates the PIT so that the interface that received the interest packet is associated with the object requested by this interest packet. On the other hand, if the forwarding device is not waiting to receive the object requested by the received interest packet, the forwarding device forwards the interest packet from the interface determined based on the FIB and updates the PIT. Furthermore, upon receiving the object, the forwarding device determines the interface to which the object is to be forwarded based on the PIT, and deletes the information regarding the object from the PIT. Furthermore, the forwarding device updates the CS by saving the received and forwarded object.

NPTL 2 discloses a configuration in which a CCN packet is forwarded in an OpenFlow network. Here, "OpenFlow network" refers to a network in which a communication device that forwards a packet, and a control device that sets, in the communication device, the forwarding destination for the packet of the communication device are separate. The control device of the OpenFlow network identifies flows based on, for example, the destination address, the source address, the destination port number, or the source port number of an IP packet, determines a pathway for each flow in the OpenFlow network, and sets an output interface for the packet that belongs to the flow, in forwarding devices on the determined pathway. In NPTL 2, the forwarding of a CCN packet in the OpenFlow network is performed by obtaining a hash value of the name of the content contained in the CCN packet and setting the hash value in an IP packet destination address.

CITATION LIST

Patent Literature

PTL 1: Japanese Patent Laid-Open No. 2009-277234

Non-Patent Literature

Non-PTL 1: V. Jacobson, et al., "Networking Named Content", in Proceedings of ACM CoNEXT 2009, December 2009

Non-PTL 2: Atsushi OOKA, et al., "A Deployment of Content-Centric Networking by Using OpenFlow Networks", Technical Report of The Institute of Electronics, Information and Communication Engineers (IN2013-19), May 2013

SUMMARY OF INVENTION

Technical Problem

In the configuration of NPTL 2, the control device manages caches of contents, PITs and the like of forwarding devices, thus increasing the processing load on the control device.

Solution To Problem

According to one aspect of the present invention, a communication device with a plurality of first interfaces and at least one second interface includes: a forwarding unit configured to forward, if a first packet received via one of the plurality of first interfaces is not directed to the communication device, the first packet via one of the plurality of first interfaces based on a flow table, and determine, if the first packet is directed to the communication device, whether or not a forwarding destination address of the first packet can be specified based on a value contained in a first field of the first packet, the forwarding unit setting, if the forwarding destination address of the first packet can be specified, the specified forwarding destination address as the destination address of the first packet and forwarding the first packet via one of the plurality of first interfaces based on the flow table; and a processing unit configured to perform, if no forwarding destination address of the first packet that indicates this communication device can be specified and the first packet includes a first request packet that requests an object obtained by dividing content, according to an object name of the object, processing for specifying, based on the object name, whether a forwarding destination of the first request packet is included in the plurality of first interfaces or the at least one second interface, the processing unit performing, if the forwarding destination of the first request packet is included in the at least one second interface, processing for specifying a second interface from which the first request packet is to be output.

Other features and advantages of the present invention will be apparent from the following description taken in conjunction with the accompanying drawings. Note that the same reference numerals denote the same or like components throughout the accompanying drawings.

BRIEF DESCRIPTION OF DRAWINGS

FIG. 5A is a diagram illustrating an FIB according to one embodiment.

FIG. 5B is a diagram illustrating a hash value table according to one embodiment.

FIG. 6 is a diagram illustrating a PIT according to one embodiment.

DESCRIPTION OF EMBODIMENTS

Hereinafter, exemplary embodiments of the present invention will be described with reference to the drawings. Note that constituent components not essential for the description of the embodiments are omitted below from the drawings. Furthermore, the embodiments below are exemplary and do not limit the present invention to the content of the embodiments.

Figure 1:
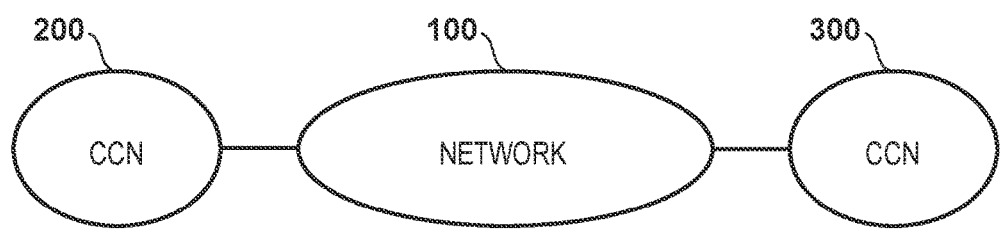
FIG. 1 is a diagram illustrating a network configuration according to one embodiment.

FIG. 1 shows a network 100 according to the present embodiment. The network 100 relays a CCN packet between a CCN 200 and a CCN 300. Here, CCN packets are classified into interest packets for requesting an object of content, and data packets that include the object and are transmitted as a response to an interest packet. Note that the network 100 also performs relay between normal IP networks other than the CCNs. Note also that a description below will be given assuming that the network 100 performs relay between CCNs, but the present invention is also applicable to relay performed between other suitable networks on which content is divided into objects and an interest packet is forwarded based on the names of the objects.

Similar to the OpenFlow network, the network 100 includes a communication device and a control device. The following will describe a protocol of the normal OpenFlow network. A communication device of the OpenFlow network has a flow table. The flow table is a table indicating the relationship between a flow and an output destination, and the communication device determines, upon receiving an IP packet, the flow to which the IP packet belongs based on header information of the IP packet, and outputs the IP packet from the interface indicated in the flow table. Furthermore, if there is no information regarding the flow to which the received IP packet belongs in the flow table, the communication device transmits a copy of the received IP packet to a control device. The control device determines the flow and its pathway based on the received IP packet, and notifies communication devices on the pathway of a relationship between the header information of the IP packet used to specify the flow and the output destination, so as to cause the communication devices to update their flow tables.

Figure 4:
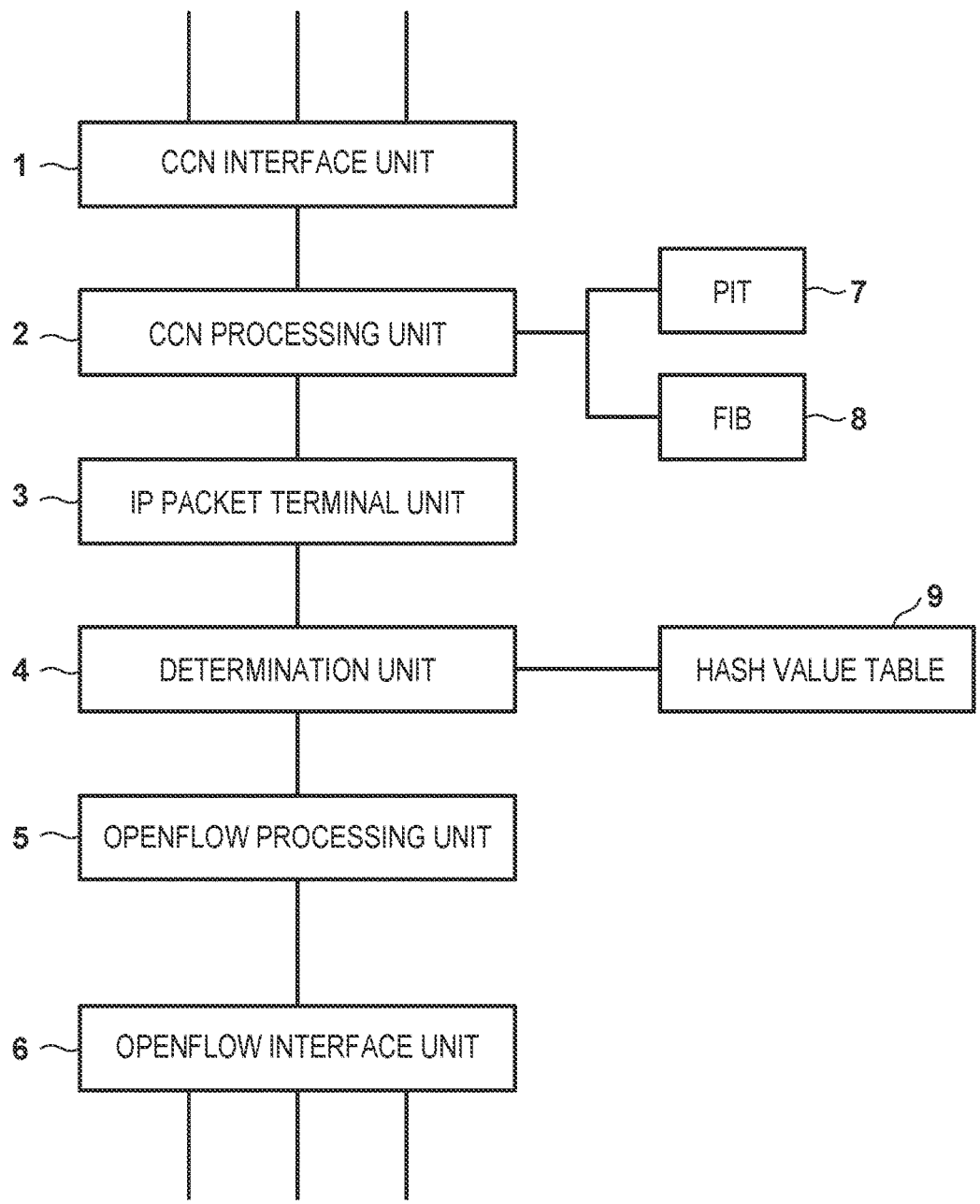
FIG. 4 is a diagram illustrating a configuration of a communication device according to one embodiment.

FIG. 4 is a diagram illustrating a configuration of the communication device of the network 100 according to the present embodiment. A CCN interface unit 1 that includes at least one interface for connecting to a CCN. A CCN processing unit 2 performs processing for forwarding a CCN packet, namely, an interest packet and a data packet, based on a PIT 7 and an FIB 8. If a CCN packet received by the CCN interface unit 1 is to be relayed in the network 100, an IP packet terminal unit 3 performs processing for encapsulating the CCN packet into an IP packet. Also, if a CCN packet contained in an IP packet relayed in the network 100 is to be transmitted from an interface of the CCN interface unit 1, the IP packet terminal unit 3 performs processing for extracting the CCN packet from the received IP packet. A determination unit 4 and a hash value table 9 will be described later. An OpenFlow processing unit 5 forwards the IP packet in accordance with the above-described OpenFlow protocol. Note that the OpenFlow processing unit 5 has a not-shown flow table. The flow table indicates the relationship between a flow and an output destination interface, and the content thereof is designated by a not-shown control device. An OpenFlow interface unit 6 includes a plurality of interfaces for connecting to other communication devices. Note that the network 100 includes, in addition to the communication devices, the control device for controlling the communication devices, but a description of the control device will be omitted because processing between the control device and the communication devices is performed in accordance with the OpenFlow protocol.

Figure 2:
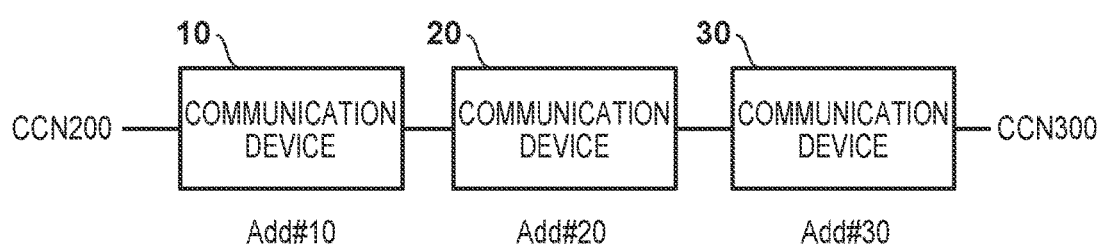
FIG. 2 is a diagram illustrating a configuration of relay of a CCN packet according to one embodiment.

Hereinafter, an operation of the communication devices will be described taking, as an example, a case where, as shown in FIG. 2, communication devices 10, 20, and 30 according to the present embodiment are used to forward an interest packet received from the CCN 200 to the CCN 300, and forward a data packet received from the CCN 300 to the CCN 200 as a response to the forwarded interest packet. Note that the interest packet is assumed to request an object whose object name is "/KDDI.com/A/1", and the communication devices 10, 20, and 30 are assumed to not have cached the object. Furthermore, the interest packet that requests the object whose object name is "/KDDI.com/A/1" is assumed to have been received for the first time.

In the configuration of FIG. 2, one interface of the OpenFlow interface unit 6 of the communication device 10 is connected to one interface of the OpenFlow interface unit 6 of the communication device 20, and one interface of the OpenFlow interface unit 6 of the communication device 20 is connected to one interface of the OpenFlow interface unit 6 of the communication device 30. Furthermore, one interface of the CCN interface unit 1 of the communication device 10 is connected to the CCN 200, and one interface of the CCN interface unit 1 of the communication device 30 is connected to the CCN 300. Furthermore, necessary information is assumed to have been set in advance in the PITs 7, the FIBs 8, and the hash value tables 9 of the communication devices 10, 20, and 30. Furthermore, as shown in FIG.

2, it is assumed that the IP addresses of the communication devices 10, 20, and 30 are Add#10, Add#20, and Add#30, respectively.

When the communication device 10 has received an interest packet from the CCN 200 via its CCN interface unit 1, the communication device 10 outputs the received interest packet to the CCN processing unit 2. The CCN processing unit 2 determines whether or not the object that is requested by the received interest packet and whose name is "/KDDI.com/A/1" has been cached. In the present example, since the object has not been cached, the CCN processing unit 2 determines, based on the PIT 7, whether or not the communication device 10 has forwarded an interest packet requesting the object whose name is "/KDDI.com/A/1", and is waiting to receive the object. In the present example, since the communication device 10 is not waiting to receive the object, the CCN processing unit 2 determines the forwarding destination of the interest packet based on the FIB 8.

FIG. 5A shows an example of the FIB 8 of the communication device 10. Typically, the FIB 8 indicates the forwarding destination interface that corresponds to the object name. In the present embodiment, if the forwarding destination of the interest packet is an interface of the CCN interface unit 1, information for specifying the forwarding destination interface is set as the forwarding destination interface of the FIB 8. For example, in FIG. 5A, "IF#1", which is an interface of the CCN interface unit 1, is set for the object name "A". On the other hand, if the forwarding destination of the interest packet is an interface of the OpenFlow interface unit 6, that is, if the forwarding destination of the interest packet is in the network 100, an IP address is set as the forwarding destination interface of the FIB 8. In the FIB 8 of FIG. 5A, the IP address of the communication device 20 is set for the interest packet that requests the object whose object name is "/KDDI.com/A". Note that "/KDDI.com/A" means "/KDDI.com/A*", where "*" is an arbitrary character string. In other words, in the example of FIG. 5A, the IP address of the communication device 20 is set as the forwarding destination of the interest packet requesting the object whose object name is "/KDDI.com/A/1". Therefore, the CCN processing unit 2 determines that this interest packet is to be forwarded in the network 100, and outputs the interest packet to the IP packet terminal unit 3. At this time, the CCN processing unit 2 notifies the IP packet terminal unit 3 of "/KDDI.com/A", which is an object name of a hit entry of the FIB 8, and "Add#20" that is an IP address indicated as the forwarding destination thereof. Furthermore, the CCN processing unit 2 adds, to the PIT 7, information indicating an output destination for a data packet to be received as a response to the interest packet. The "output destination" is the interface of the CCN interface unit 1 that has received the interest packet.

Figure 3A:
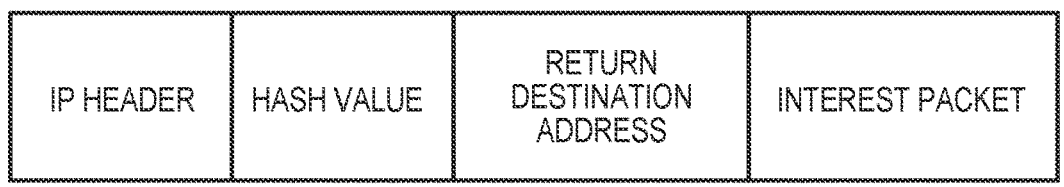
FIG. 3A is a diagram illustrating encapsulation of an interest packet according to one embodiment.

As shown in FIG. 3A, the IP packet terminal unit 3 adds, to the received interest packet, a return destination address field and a hash value field as well as an IP header, to create an IP packet. Here, "Add#10", which is its own IP address, that is, the IP address of the communication device 10, is stored in the return destination address field. Furthermore, the hash value of "/KDDI.com/A" provided by the CCN processing unit 2 is stored in the hash value field. Note that, in the present example, it is assumed that the hash value of "/KDDI.com/A" is "Hash#1". Furthermore, the IP packet terminal unit 3 sets the IP address of the communication device 20 provided by the CCN processing unit 2, that is, "Add#20", as the destination address in the IP header.

Then, the IP packet terminal unit 3 outputs the IP packet created in this way to the OpenFlow processing unit 5 via the determination unit 4. If the destination address of the IP packet does not indicate the communication device 10, the OpenFlow processing unit 5 performs processing in accordance with normal OpenFlow protocol. Accordingly, this IP packet is transmitted to the communication device 20 via the interface of the OpenFlow interface unit 6.

Upon receiving the IP packet from the communication device 10 via the interface of the OpenFlow interface unit 6, the communication device 20 outputs the IP packet to the OpenFlow processing unit 5. The OpenFlow processing unit 5 checks the destination address in the IP header of the IP packet. If the destination address in the IP header does not indicate the communication device 20, the communication device 20 identifies the flow and forwards the IP packet based on the flow table, in accordance with normal OpenFlow protocol. On the other hand, if the destination address in the IP header indicates the communication device 20, the communication device 20 outputs the received IP packet to the determination unit 4. In the present example, since the destination address indicates the communication device 20, the OpenFlow processing unit 5 outputs the received IP packet to the determination unit 4.

The determination unit 4 checks whether or not the value set in the hash value field of the IP packet is present in the hash value table 9. The hash value table 9 is a table indicating the correspondence relationship between the value set in the hash value field of the IP packet and the IP address of the forwarding destination. If the value set in the hash value field of the received IP packet is present in the hash value table 9, the communication device 20 sets the IP address indicated by the hash value table as the destination address in the IP header of the received IP packet, and outputs it to the OpenFlow processing unit 5. The OpenFlow processing unit 5 processes the IP packet received from the determination unit 4 in accordance with normal OpenFlow protocol. On the other hand, if the value set in the hash value field of the received IP packet is not present in the hash value table 9, the determination unit 4 outputs the IP packet to the IP packet terminal unit 3. The IP packet terminal unit 3 extracts a CCN packet from the IP packet, and outputs the extracted CCN packet to the CCN processing unit 2, and the CCN processing unit 2 determines the forwarding destination based on the FIB 8. Note that if no forwarding destination can be determined based on the FIB 8, the CCN packet is discarded.

FIG. 5B shows the hash value table 9 included in the communication device 20 according to the present example. In FIG. 5B, "Add#30", which is the address of the communication device 30, is set as the destination IP address of "Hash#1" set in the hash value field. In this case, the determination unit 4 of the communication device 20 changes the destination address of the received IP packet to "Add#30", and outputs the changed IP packet to the OpenFlow processing unit 5. The OpenFlow processing unit 5 transmits this IP packet to the communication device 30 via the interface of the OpenFlow interface unit 6.

Note that, in the present example, it is assumed that the address of the communication device 30 is set as the destination IP address of "Hash#1" in the hash value table 9 included in the communication device 20. However, there may also be a case where the hash value table 9 does not include a "Hash#1" entry, but the FIB 8 of the communication device 20 includes the IP address of the communication device 30 set as the forwarding destination for the object with the object name "/KDDI.com/A/1". In this case, the determination unit 4 outputs the IP packet to the IP packet terminal unit 3, and the IP packet terminal unit 3 extracts the interest packet from the IP packet and outputs the extracted interest packet to the CCN processing unit 2. The CCN processing unit 2 determines, based on the object name indicated by the interest packet, the forwarding destination for the interest packet. Here, in this example, the IP address of the communication device 30 is set as the forwarding destination for the interest packet. Accordingly, similar to the processing performed when the CCN processing unit 2 of the communication device 10 receives the interest packet, the CCN processing unit 2 of the communication device 20 processes the interest packet, and the interest packet is encapsulated as shown in FIG. 3A and is transmitted to the communication device 30.

The communication device 30 outputs the IP packet received from the communication device 20 to the Open-Flow processing unit 5. Since the destination address of the received IP packet is the address of the communication device 30, the OpenFlow processing unit 5 outputs the IP address to the determination unit 4. The hash value "Hash#1" is not stored in the hash value table 9 of the communication device 30, and the determination unit 4 outputs the received IP packet to the IP packet terminal unit 3, and the IP packet terminal unit 3 outputs the interest packet stored in the IP packet to the CCN processing unit 2. Furthermore, the IP packet terminal unit 3 notifies the CCN processing unit 2 of "Add#10", which is the IP address of the communication device 10, set in the return destination address field.

Note that the communication device 30 receives not only CCN packets transmitted and received between the CCN 200 and the CCN 300 but also an IP packet whose final destination is the communication device 30. No CCN packet is stored in this IP packet although the destination address of the IP packet is the address of the communication device 30. Accordingly, if a CCN packet is stored in the IP packet input from the determination unit 4, the IP packet terminal unit 3 outputs the CCN packet to the CCN processing unit 2, whereas if no CCN packet is stored therein, the IP packet terminal unit 3 outputs the payload of the IP packet to a not-shown processing unit so that it is processed in the communication device 30. Note that a configuration is possible in which, for example, the IP header indicates whether or not a CCN packet is stored.

The CCN processing unit 2 determines the forwarding destination interface for the interest packet based on the FIB 8. In the present example, an interface of the CCN interface unit 1 is indicated by the FIB 8, and the CCN processing unit 2 forwards the interest packet to the CCN 300 via this interface. Furthermore, in the PIT 7, the IP address of the communication device 10 that is provided by the IP packet terminal unit 3 is set as the destination for a data packet, which is received as a response to the interest packet. FIG. 6 shows the PIT 7 of the communication device 30 at this time.

Figure 3B:
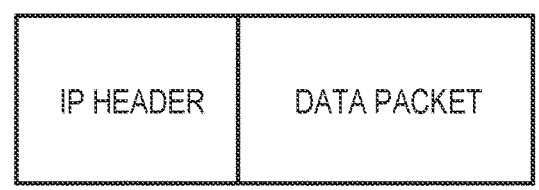
FIG. 3B is a diagram illustrating encapsulation of a data packet according to one embodiment.

Then, the CCN processing unit 2 of the communication device 30 receives, as a response to the previously transmitted interest packet, a data packet from the CCN 300 via the interface of the CCN interface unit 1. The CCN processing unit 2 determines, based on the PIT 7, the interface to which the data packet is to be returned. Here, typically, a value indicating an interface is stored in the PIT 7, but in the present example, as described above, an IP address of the communication device 10 is stored as the interface to which the data packet is to be returned. In the present embodiment, similar to the description of the FIB 8, if the forwarding destination for the data packet is an interface of the CCN interface unit 1, information for specifying the interface is stored as the forwarding destination in the PIT 7. On the other hand, if the forwarding destination for the data packet is an interface of the OpenFlow interface unit 6, that is, if the data packet is to be forwarded in the network 100, an IP address is stored as the forwarding destination in the PIT 7. Accordingly, if an IP address is stored as the forwarding destination in the PIT 7, the CCN processing unit 2 outputs the data packet to the IP packet terminal unit 3. Note that, at this time, the CCN processing unit 2 notifies the IP packet terminal unit 3 of the IP address indicated by the PIT 7, that is, "Add#10", which is an IP address of the communication device 10, in the present example. The IP packet terminal unit 3 creates the IP packet shown in FIG. 3B. Here, the IP address provided by the CCN processing unit 2, that is, the IP address of the communication device 10 in the present example, is stored as the destination address in the IP header.

The IP packet created by the IP packet terminal unit 3 is transmitted to the OpenFlow processing unit 5 via the determination unit 4. The OpenFlow processing unit 5 transmits the IP packet to the communication device 10 based on the IP address of the IP packet. Note that, since the destination address of the IP packet indicates the communication device 10, the communication device 20 only performs simple forwarding processing using the OpenFlow processing unit 5.

The communication device 10 outputs this IP packet to the determination unit 4 since the destination address of the IP address received from the communication device 30 indicates the communication device 10. The IP packet does not include a hash value field, and thus the determination unit 4 outputs the IP packet to the IP packet terminal unit 3. Since the IP packet includes a data packet, that is, a CCN packet, the IP packet terminal unit 3 extracts the data packet from the IP packet and outputs the extracted data packet to the CCN processing unit 2. The CCN processing unit 2 transmits the data packet from the interface of the CCN interface unit 1 according to the PIT 7.

The following will describe how a hash value table 9 is created. An FIB 8 is held in CCN. Here, a hash value table 9 can be created from the FIB 8 held by the same device. In other words, the hash value table 9 is a table obtained by converting the object name of one of the entries in the FIB 8 in which an IP address is set as the forwarding destination into a hash value and setting the same IP address as the forwarding destination. Note that, in this case, an interest packet is subjected to conversion of its destination address in the IP header using the hash value tables 9 of the determination units 4 of all communication devices from the communication device connected to the CCN 200 to the communication device connected to the CCN 300, and is forwarded. However, in the present embodiment, the data packet is transmitted directly from the communication device connected to the CCN 300 to the communication device connected to the CCN 200, based on the return destination address field, and the communication device located between these communication devices only performs processing using its OpenFlow processing unit 5. Accordingly, the data packet can be forwarded faster. Furthermore, the interest packet can also be forwarded faster than in a normal CCN since it does not require processing to be performed by the CCN processing unit 2 of an intermediate communication device.

Furthermore, in the network 100 of the present embodiment, the not-shown control device only performs normal OpenFlow processing between the communication devices of the present embodiment, thus preventing an increase in the processing load on the control device. Note that a configuration is also possible in which, for example, an IP address of the communication device 30 connected to the CCN 300 is set as the forwarding destination of "/KDDI- .com/A" in the FIB 8 of the communication device 10. In this case, the interest packet can also be forwarded faster since it is possible to omit the processing that is performed thereon by the determination unit 4 of the intermediate communication device.

Furthermore, according to one embodiment of the present invention, a computer-readable storage medium for storing a computer program is provided. The computer program, when executed by a processor of a communication device, causes the communication device to function as the communication device described with reference to FIG. 4.

The invention claimed is:

1. A communication device with a plurality of first interfaces and at least one second interface, comprising:
a forwarding unit configured to forward, if a destination address of a first packet received via one of the plurality of first interfaces does not indicate an address of the communication device, the first packet via one of the plurality of first interfaces based on a flow table, and determine, if the destination address of the first packet indicates the address of the communication device, whether or not a forwarding destination address of the first packet can be specified based on a value contained in a first field of the first packet, wherein the forwarding unit sets, if the forwarding destination address of the first packet can be specified, the specified forwarding destination address as the destination address of the first packet and forwards the first packet via one of the plurality of first interfaces based on the flow table; and
a processing unit configured to perform, if the destination address of the first packet indicates the address of the communication device, the forwarding destination address cannot be specified based on the value contained in the first field, and the first packet includes a first request packet that requests an object obtained by dividing content, according to an object name of the object, processing for specifying, based on the object name, whether a forwarding destination of the first request packet is included in the plurality of first interfaces or the at least one second interface, wherein the processing unit performs, if the forwarding destination of the first request packet is included in the at least one second interface, processing for specifying a second interface from which the first request packet is to be output.

2. The communication device according to claim 1, wherein the processing unit is further configured to specify whether the forwarding destination of the first request packet is included in the plurality of first interfaces or the at least one second interface, based on a first table indicating a relationship between an object name and a forwarding destination of a request packet that requests an object of this object name, and the processing unit is further configured to specify, if the forwarding destination of the first request packet is included in the at least one second interface, a second interface from which the first request packet is to be output.

3. The communication device according to claim 2, wherein the first table indicates one of the at least one second interface as the forwarding destination if the forwarding destination of the request packet is included in the at least one second interface, and indicates an address as the forwarding destination if the forwarding destination of the request packet is included in the plurality of first interfaces.

4. The communication device according to claim 3, wherein, if an address is indicated as the forwarding destination of the first request packet in the first table, the processing unit is further configured to encapsulate the first request packet to create a second packet, and set the address indicated by the first table as a destination address of the created second packet, and the forwarding unit is further configured to forward the second packet via one of the plurality of first interfaces based on the flow table.

5. The communication device according to claim 3, wherein an address is set in a second field of the first packet,
if a second interface is indicated as the forwarding destination of the first request packet in the first table, the processing unit is further configured to output the first request packet from the second interface, and store, in a second table, a relationship between the object name of the object requested by the first request packet and the address set in the second field, and upon receiving a data packet including an object as a response to the first request packet via the second interface, the processing unit is further configured to encapsulate the data packet to create a third packet, and set the address stored in the second table as a destination address of the created third packet, and
the forwarding unit is further configured to forward the third packet via one of the plurality of first interfaces based on the flow table.

6. The communication device according to claim 1, wherein a hash value based on the object name of the object requested by the first request packet is stored in the first field of the first packet.

7. The communication device according to claim 6, wherein the forwarding unit has a third table indicating the hash value and a forwarding destination address, and is further configured to determine whether or not the forwarding destination address of the first packet can be specified based on the third table.

8. A non-transitory computer-readable storage medium in which a computer program is stored,
wherein the computer program, when executed by one or more processors of a communication device, causes the communication device to function as the communication device according to claim 1.

* * * * *